3,819,797

CYCLIC LEACH-PRECIPITATION PROCESS FOR RECOVERING COPPER VALUES FROM BODIES OF ORE MATERIAL CONTAINING COPPER MINERALS

Henry Rush Spedden and Emil Edward Malouf, Salt Lake City, Utah, assignors to Kennecott Copper Corporation, New York, N.Y.

No Drawing. Continuation of application Ser. No. 55,578, July 16, 1970, now Patent No. 3,661,563. This application Oct. 14, 1971, Ser. No. 189,335

The portion of the term of the patent subsequent to Jan. 1, 1989, has been disclaimed Int. Cl. C22b 15/08

U.S. Cl. 423—27                6 Claims

ABSTRACT OF THE DISCLOSURE

As part of a cyclic, leaching-precipitation process for copper values, a reductant, such as a reducing gas or reducing ions selected from the group consisting of sulfite ion and bisulfite ion, is injected into a body of copper-mineral-bearing material. The injection site or sites are removed from access of atmospheric air, and injection is carried out in the absence of oxygen to prevent auto-oxidation of the reducing agent. When injected in an area adjacent the emergence from such body of an applied acidic leach solution containing ferric ions and pregnant with copper values, in order to reduce ferric ions in such leach solution to ferrous ions so difficulty, e.g. useless consumption of metallic iron precipitant, in the copper recovery stage is avoided, such reductant also acts as a bactericide to eliminate both autotropic aerobic bacteria, which oxidize ferrous to ferric iron in presence of oxygen, and anaerobic hydrogenase-producing strains of bacteria, which reduce sulfates in the absence of oxygen and produce hydrogen sulfide that undesirably precipitates soluble copper into insoluble copper sulfide. If such an area in the body of material or if other areas therein have become, either naturally or from applied leaching practices, substantially impervious to the continued percolation of a leach solution therethrough, they are rendered highly pervious by the injection thereinto of such reductant. A concomitant effect of this treatment is the release of water, rich in copper values, that had been impound in mine waste dumps or other bodies of material previously subjected to leaching. The reducing ions may be conveniently injected as a sulfite or bisulfite solution. When the reductant is a reducing gas, such as sulfur dioxide or carbon monoxide, it is preferably injected directly into the material concerned.

Related Case

The present application is a continuation-in-part of our similarly-entitled, allowed, copending application Ser. No. 55,578 filed July 16, 1970, now U.S. Pat. No. 3,661,563 issued May 9, 1972.

Background of the Invention

Field.—The invention is in the field of hydrometallurgical processing of materials containing copper minerals and is particularly related to cyclic leaching processes applied to normally pervious bodies of ore materials, e.g. dumps of mine waste, heaps of previously mined ore, mill tailings, etc., and to broken or otherwise pervious bodies of ore in situ, wherein the dissolved copper in the pregnant leach solution is recovered by precipitation on metallic iron, by solvent extraction, or by electrowinning, and the depleted solution is recycled through such body of ore materials. The invention is concerned with making both the leaching and recovery of copper more efficient and with normally pervious bodies that have become impervious by the precipitation therein of water-insoluble iron salts.

State of the Art.—Hydrometallurgical processes of the general type concerned are well known and widely used for the recovery of copper values from mine waste dumps of ore materials too low in grade to warrant processing by the usual milling procedures. Ferric ions are necessary in the acidic leach solution used to dissolve copper sulfide mineral values normally present in waste ore materials being leached. However, any carry-over of ferric ions in the pregnant leach solution or formation of ferric ions in such solution after it reaches collection channels beneath the dumps is detrimental to copper recovery procedures, in that such ferric ions wastefully consume metallic iron precipitant in cementation recovery procedures, compete with the copper ions in solvent extraction procedures, and waste power in electrowinning procedures. Even where only copper oxide minerals are present in ore materials being leached, iron values are normally leached from such materials concurrently with the copper values and inevitably result in the presence of ferric ions in the pregnant leach solution to the detriment of the recovery stage of the process. The presence of an excessive quantity of ferric ions in a leach solution results in the precipitation of water-insoluble iron salts in the interstices of a body of material being leached and sometimes such salts are deposited naturally.

There are various ways presently known of eliminating ferric ions from a pregnant leach solution. Thus, as disclosed in our copending application Ser. No. 823,695 filed May 12, 1969, now U.S. Pat. No. 3,634,071, entitled "Improved Process for Precipitating Copper from Solution," the pregnant leach solution which flows from a mine waste dump is contacted with sulfur dioxide under conditions of vigorous agitation. Again, as disclosed in the copending application of Henry R. Spedden, John A. Apps, and Donald F. Lowe, Ser. No. 28,874 filed Apr. 15, 1970 and entitled "Reduction of Ferric Ions in Cyclic Process of Leaching and Precipitation of Copper," a controlled quantity of a reductant of the type here utilized is added to a pregnant leach solution which flows from a mine waste dump and the resulting solution is brought into contact with an activated carbon catalyst for a controlled period of time. Getting rid of precipitated iron salts, that render a normally previous body impervious, has always been a problem.

Summary of the Invention

In accordance with the present invention, a reductant such as a reducing gas, e.g. sulfur dioxide or carbon monoxide, or reducing ions selected from the group consisting of sulfite ion and bisulfite ion, is injected directly into a mine waste dump or other body of copper-mineral-bearing material being leach, so as to accomplish one or more of the following: eliminate precipitant-caused imperviousness, kill undesirable bacteria, and rid emerging leach solution of ferric ions. Injection of the reductant is carried out in the absence of atmospheric air or other oxygen and either as a sulfite or bisulfite solution or a reducing gas such as sulfur dioxide or carbon monoxide. We have found that, even with a relatively short emergence time for the pregnant leach solution following injection of the reducing ions in an area adjacent emergence of such solution, e.g. an hour, ferric ions are largely eliminated therefrom. Moreover, based on test in dump leching according to the invention, it has been found that the reductant acts as a bactericide with respect to anaerobic, hydrogenase-producing strains of bacteria normally present in the interior of the dump at locations free from the penetration of atmospheric air. This is a decided advantage, since such bacteria reduce sulfates in the pregnant leach solution and also generate sulfide, which acts to precipitate soluble copper into insoluble copper sulfide. Additionally, we have found that the reductant also acts as a bactericide with respect to autotropic aerobic bacteria in areas near the toe of the dump that are penetrated by atmospheric air, and thereby minimizes oxidation of ferrous ions back to the ferric state. Wherever injected in the absence of atmospheric air, we have found that precipitated, water-insoluble iron salts are largely eliminated, releasing water rich in copper that had been impounded, and effectively returning the body of material to its normal pervious condition.

The reductant is conveniently injected through a bore hole or holes drilled into the body of materials at an appropriate surface location or locations.

Detailed Description of Preferred Procedure

The best mode presently contemplated of carrying out the invention is the use of an aqueous reductant solution of sulfur dioxide (sulfurous acid) or of sodium or ammonium bisulfite and the injection of such a solution into the waste dump or other body of copper-mineral-bearing material, first, near the point or points of emergence therefrom of pregnant leach solution, but sufficiently far into the body to avoid atmospheric air penetration, followed by additional injections farther back and upwardly in the body at appropriate distance intervals on a sequentially retreating basis for ridding the body of accumulations of water-insoluble precipitated iron salts.

The reductant solution is preferably injected through a bore hole or holes extending from the surface to the location or locations of utilization in the body of ore materials concerned. Besides dissolving water-insoluble precipitated iron salts, it effectively eliminates anaerobic, hydrogenase-producing strains of bacteria active in areas of such body not penetrated by atmospheric air. Mixing with the pregnant leach solution about to emerge from the body, such reductant solution eliminates ferric ions from such pregnant leach solution and additionally prevents the reduction of sulfates and the formation of hydrogen sulfide that will convert soluble copper to copper sulfide.

Large scale field tests made on a waste dump of a large copper mine have shown the effectiveness of the process of the invention. In a first test, a quantity of 100 tons of aqueous ammonium bisulfite solution was used as the reductant. It contained the equivalent of 30 tons of sulfur dioxide and, stoichiometrically, could reduce 101,250 pounds of ferric iron. The reductant solution was injected through a bore hole extending 200 feet down from the surface of the dump directly over but 80 feet short of reaching the underground stream channel into which all the leach solution applied to the top of the dump seeped for flow from the dump. The reaction zone below the injection location was tested and found to be free of air. The horizontal distance from such reaction zone to the toe of the dump was approximately 750 feet.

The results of this test showed that 90,956 pounds of ferric iron were reduced over a 21 hour period and that the efficiency of conversion was 89.8%. An additional 7,000 pounds of copper were recovered during the 21 hour period of the test over and above the amount that had been recovered by ordinary leaching techniques carried out druring the previous seven days. The concentration of copper in the pregnant leach solution reached a peak of 13.9 pounds per 1,000 gallons, as contrasted to 9.5 pounds during normal leaching procedures. Moreover, the acidity of the effluent pregnant leach solution increased to a pH of 2.2 from a pH of 2.3 for effluent pregnant solution during the usual leaching procedures.

In a second test carried out approximately a month later on the same dump utilizing the same bore hole, a second quantity of 100 tons of aqueous ammonium bisulfite solution was injected. This reductant solution contained the equivalent of 36.5 tons of sulfur dioxide and was injected into the bore hole at intervals over a period of several days. An initial quantity of 2,250 gallons was injected over a period of 1½ hours the morning of the first day; 24 hours later, a total of 3,200 gallons of the reductant solution was injected over a period of an hour and a quarter; 48 hours later, an additional quantity of 3,600 gallons was injected over a period of two hours. On the last day, 72 hours later, the remaining 9,000 gallons of the reductant solution was injected over a period of three hours. The results of this second test in terms of effluent solution over a period of 13 days immediately following and including the final days of injecting the reductant solution are shown in Table II. For comparative purposes Table I shows the results of normal leaching practices in terms of effluent solution for the 16 day period immediately preceding this second test of the invention and including the first three days of injection of the reductant solution.

TABLE I

[Normal practice]

| Time (day) | Flow, g.p.d. | Pounds/1,000 gallons | | | |
|---|---|---|---|---|---|
| | | Copper | Iron total | Ferrous | Ferric |
| 1st | 12,055,680 | 5.0 | 23.4 | 3.8 | 19.6 |
| 2nd | 11,376,000 | 4.6 | 20.9 | 1.3 | 19.6 |
| 3rd | 11,079,360 | 4.2 | 20.0 | 1.7 | 18.3 |
| 4th | 12,055,680 | 4.4 | 20.9 | 1.3 | 19.6 |
| 5th | (¹) | 4.4 | 21.1 | .8 | 20.3 |
| 6th | 9,849,600 | 4.4 | 20.9 | 1.3 | 19.6 |
| 7th | 9,921,600 | 4.3 | 18.7 | .8 | 17.9 |
| 8th | 9,504,000 | 5.8 | 20.8 | 1.7 | 19.1 |
| 9th | 9,144,000 | 3.8 | 18.8 | .8 | 18.0 |
| 10th | 10,454,000 | 4.3 | 20.2 | .4 | 19.8 |
| 11th | 10,454,000 | 3.9 | 18.8 | .8 | 18.0 |
| 12th | 10,454,000 | 4.2 | 20.4 | 3.8 | 16.6 |
| 13th | 9,511,200 | 3.8 | 20.9 | 1.6 | 19.3 |
| 14th | 7,709,000 | 3.8 | 15.0 | 1.7 | 13.3 |
| 15th | 7,709,000 | 3.8 | 18.6 | .8 | 17.8 |
| 16th | 7,709,000 | 3.9 | 17.4 | 1.7 | 15.7 |
| Arith. avg | 9,932,200 | 4.3 | 19.8 | 1.5 | 18.3 |

¹ Not available.

TABLE II

[Practice of the invention]

| Time (day) | Flow, g.p.d. | Pounds/1,000 gallons | | | |
|---|---|---|---|---|---|
| | | Copper | Iron total | Ferrous | Ferric |
| 17th | 8,596,000 | 4.7 | 17.7 | 15.4 | 2.3 |
| 18th | 9,136,800 | 4.8 | 20.0 | 4.8 | 15.2 |
| 19th | 12,391,200 | 5.3 | 21.5 | 7.5 | 14.4 |
| 20th | 10,111,680 | 5.6 | 20.4 | 7.5 | 21.9 |
| 21st | 8,589,600 | 6.2 | 21.7 | 3.3 | 18.4 |
| 22nd | 7,997,760 | 6.3 | 19.8 | 2.9 | 16.9 |
| 23rd | 7,997,760 | 6.3 | 23.0 | 5.8 | 17.2 |
| 24th | 8,589,600 | 5.9 | 22.6 | 5.8 | 16.1 |
| 25th | 9,158,400 | 6.8 | 23.0 | 6.7 | 16.3 |
| 26th | 7,433,280 | 6.9 | 21.7 | 5.8 | 15.9 |
| 27th | 10,111,680 | 6.1 | 19.2 | 0.4 | 18.8 |
| 28th | (¹) | 6.3 | 20.4 | 5.8 | 14.6 |
| 29th | (¹) | 6.3 | 21.4 | 5.8 | 15.6 |
| Arith. avg | 9,101,250 | 5.9 | 20.9 | 5.9 | 14.9 |

¹ Not available.

NOTE.—pH of solution 2.2 as against normal 2.3.

It should be realized that although the foregoing tests were carried out under conditions not capable of the close control normally possible under laboratory conditions, the results are clearly indicative of the successful accomplishment of the objectives of the invention in terms of minimizing ferric iron content of the effluent pregnant solution, of increasing its copper content, and of increasing its acidity over normal practice.

The sulfuric ferric acid-sulfate leach solution employed in instances where the body of copper-bearing-mineral materials are made up of or contain copper sulfide minerals ordinarily suffers from a build up of ferric ions which causes the precipitation of water-insoluble iron salts within the interstices of the previous body of material being leached. Whether or not copper sulfide minerals are present and such a leach solution is employed, ferric ions build up in practically all leach solutions employed on a cyclic basis due to iron values picked up from the materials being leached and/or from metallic iron used as a precipitant for the copper values carried by the pregnant solution. Precipitation of such iron salts tend to plug up the body of material and seriously interfere with continued passage of the leach solution therethrough. Moreover, similar insoluble iron salts are often formed naturally from iron minerals present in masses of copper-bearing materials, such as dumps and naturally occurring deposits. Increasing the permeability of such a mass of copper-bearing material by dissolving accumulations of insoluble iron salts has long been of concern to the art. In accordance with the invention, reducing ions in liquid solution or a reducing gas as previously described have been found to effectively dissolve the accumulated iron salts when injected into impervious areas of the dump.

Additional testing along the lines of the tests described above has indicated that it is preferable to extend the bore hole down to within approximately 50 feet short of reaching the underground stream channel in the first instance. Any precipitated water-insoluble iron salts are dissolved in the area below the termination of the bore hole by the reductant solution injected into the bore hole, and such reductant solution flows down into the stream of leach solution to carry out its reducing action on the ferric ions carried by the leach solution as previuosly explained. Distribution of the reductant solution will normally follow a conical pattern. The amount injected will depend upon core samplings indicating the extent of plugging and will depend also on the volume of leach solution to be treated and the ferric content of such leach solution.

Laboratory tests indicate that, for the purpose of dissolving water-insoluble iron salt precipitates, at least the stoichiometric equivalent of reducing ions for the iron salts to be dissolved should be employed.

Since the occurrence of such iron salt precipitate will usually be widespread in a mine waste dump or other body of copper-mineral-bearing material concerned, it will usually be advisable to drill a pattern of bore holes on 100–150 foot centers over the portion of the body being leached. After the initial injection has opened up the lower 50 foot zone at the base of the body of material, the bore hole or holes should be backfilled approximately 50 feet and more of the solution injected, after which the procedure should be repeated until the last injection is made approximately 50 feet beneath the upper surface of such body.

When a gaseous reductant is employed instead of a liquid, the injection procedure should take into consideration the disseminating characteristics of the gas and should be carried out accordingly.

In view of the several described functions carried out by the injection of a reductant into a body of copper-bearing-mineral material, it should be understood that such an injection can be employed wherever and whenever it will serve one or more of such functions.

Whereas this invention is here illustrated and described with respect to certain preferred procedures, it is to be understood that many variations are possible without departing from the inventive concepts particularly pointed out in the claims.

We claim:
1. A process for leaching and recovering copper values from copper minerals in a normally pervious body of copper-mineral-bearing materials, comprising introducing into said body below the surface at sites removed from access of atmospheric air and substantially in the absence of oxygen a fluid reductant selected from the group consisting of a solution containing sulfite reducing ions, a solution containing bisulfite reducing ions, sulfur dioxide gas, and carbon monoxide gas; and passing a leach solution containing ferric ions through said body.

2. The process of claim 1, wherein the reductant is an aqueous reductant solution of ammonium bisulfite.

3. The process of claim 1, wherein the reductant is an aqueous reductant solution of sodium bisulfite.

4. The process of claim 1, wherein the reductant is sulfurous acid.

5. The process of claim 1, wherein the reductant is introduced into the body of copper-mineral-bearing materials, first, sufficiently deeply therein to mix with pregnant leach solution as it is about to emerge from said body; and, then, on a sequentially retreating basis therefrom backwardly and upwardly in said body from the first introduction.

6. A process for leaching and recovering copper values from copper minerals in a normally pervious body of copper-mineral-bearing materials that has become plugged by the precipitation in the interstices thereof of a water-insoluble, ferric iron salt, comprising introducing into said body below the surface at sites removed from access of atmospheric air and substantially in the absence of oxygen a fluid reductant selected from the group consisting of a solution containing sulfite reducing ions, a solution containing bisulfite reducing ions, sulfur dioxide gas, and carbon monoxide gas, said fluid reductant being introduced in quantity sufficient to dissolve an effective amount of said iron salt for the purpose of opening up said normally pervious body; and passing a leach solution containing ferric ions through said body.

References Cited
UNITED STATES PATENTS

| | | | |
|---|---|---|---|
| 3,109,732 | 11/1963 | Goren | 75—101 |
| 3,669,651 | 6/1972 | Spedden et al. | 75—104 |
| 3,586,498 | 6/1971 | Kasey | 75—117 X |
| 3,117,000 | 1/1964 | Schlain et al. | 75—104 |
| 3,260,593 | 7/1966 | Zimmerley et al. | 75—117 |
| 3,218,252 | 11/1965 | Glover et al. | 75—104 X |

HERBERT T. CARTER, Primary Examiner

U.S. Cl. X.R.

75—104, 117